United States Patent [19]
Berg

[11] 4,072,269
[45] Feb. 7, 1978

[54] INHIBITING SPRAY DISPERSION: METHOD AND APPARATUS

[76] Inventor: Philip R. Berg, 1028 Century Drive, Napa, Calif. 94558

[21] Appl. No.: 711,939

[22] Filed: Aug. 5, 1976

[51] Int. Cl.² .............................................. B05B 17/04
[52] U.S. Cl. ......................................... 239/1; 239/67; 137/78
[58] Field of Search .................... 239/1, 11, 67, 70; 137/78, 80, 81

[56] References Cited

U.S. PATENT DOCUMENTS

| | | |
|---|---|---|
| 2,529,491 | 11/1950 | Gadzuk ............................... 137/78 X |
| 2,721,101 | 10/1955 | Richard, Jr. ....................... 137/78 X |
| 2,878,098 | 3/1959 | Treloar et al. ...................... 137/78 X |
| 3,117,586 | 1/1964 | Cleaver ................................. 137/78 |
| 3,361,356 | 1/1968 | Johnson et al. .................... 137/78 X |

*Primary Examiner*—John J. Love

[57] ABSTRACT

A method and system are disclosed for inhibiting spray discharge, such as the water discharge of a sprinkler system and the like under adverse wind conditions. Wind velocity is sensed to detect excess of a preselected threshold level, and time delays prevent premature deactivation and activation of valving controlling spray discharge under conditions of wind gusting and temporary calm air.

12 Claims, 7 Drawing Figures

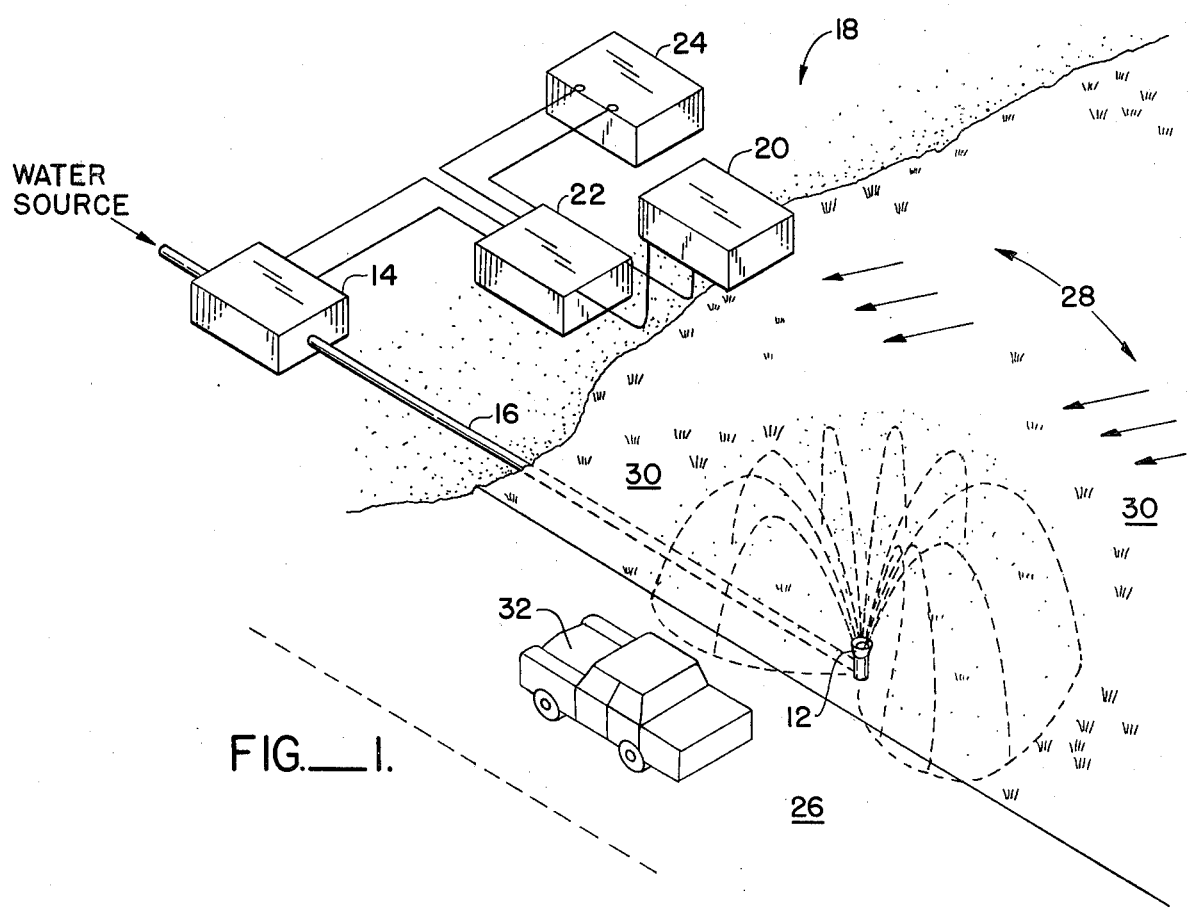
FIG._1.
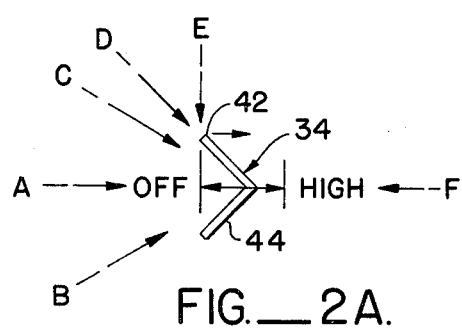
FIG._2A.
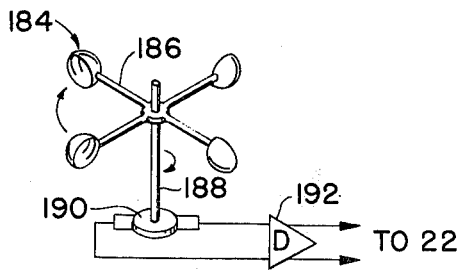
FIG._2B.
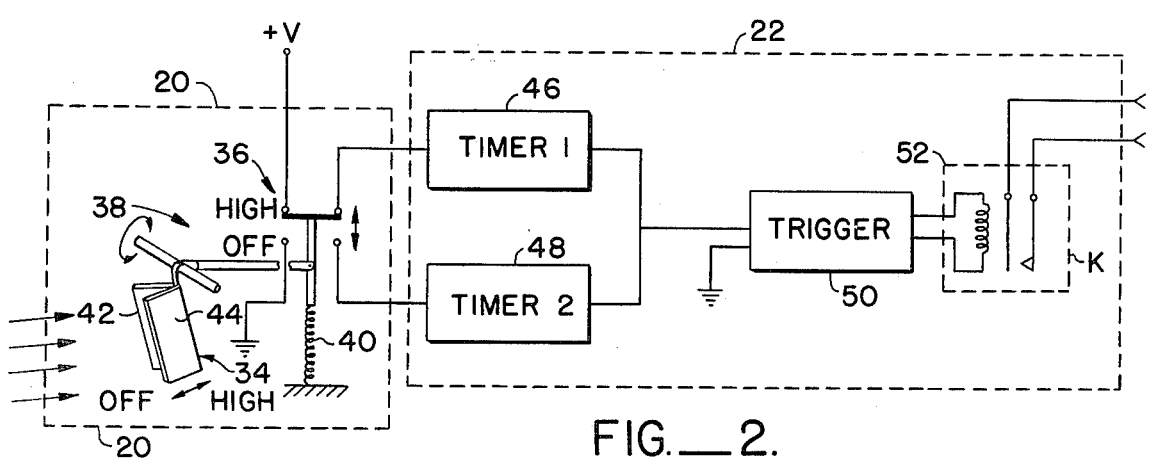
FIG._2.

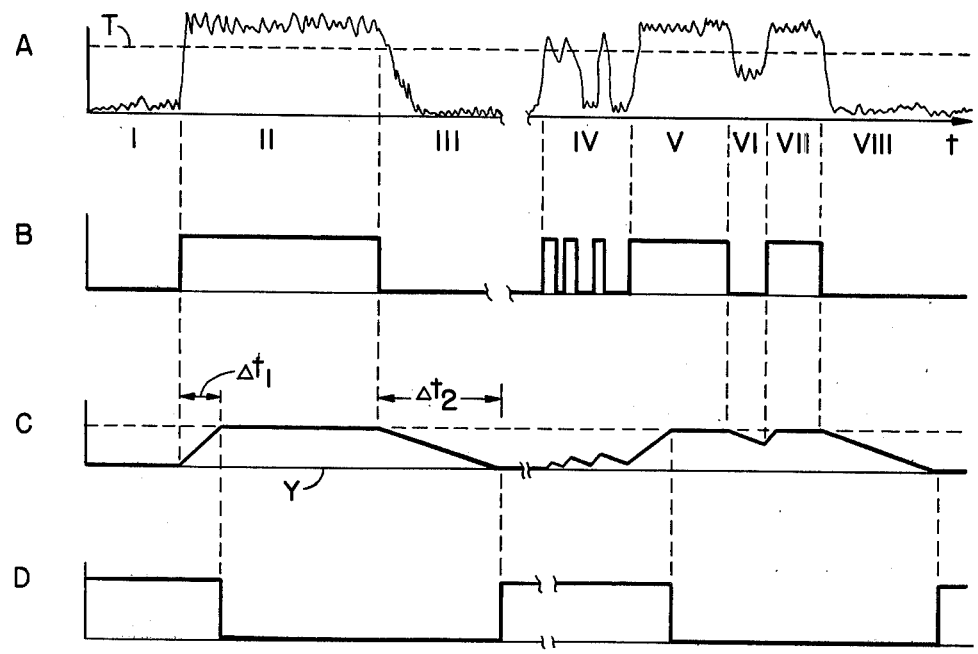
FIG.__3.
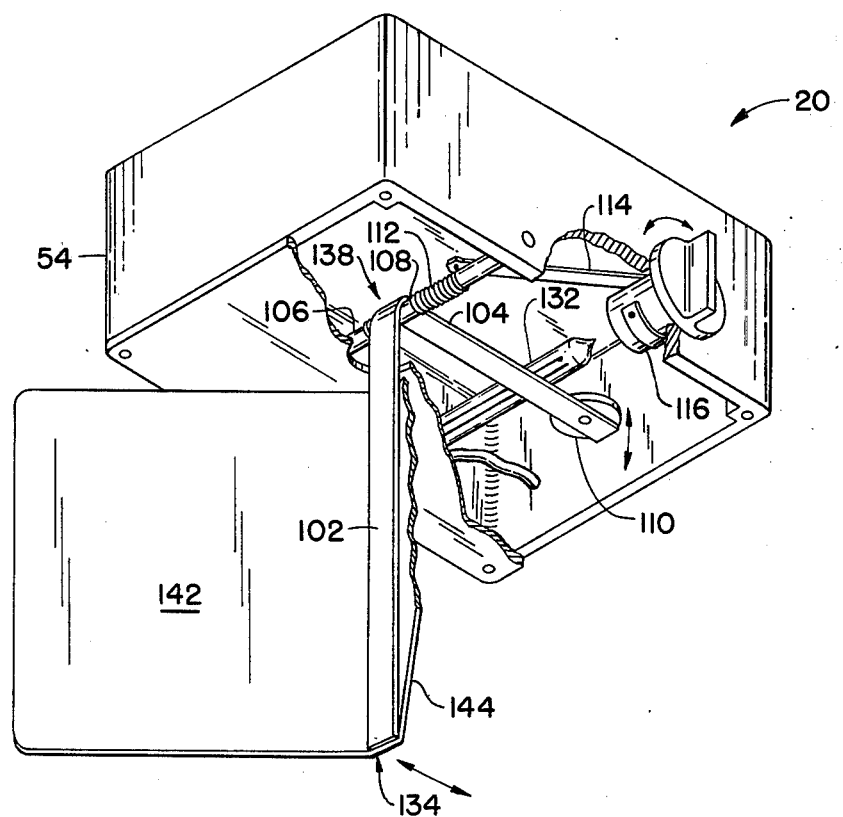
FIG.__4.

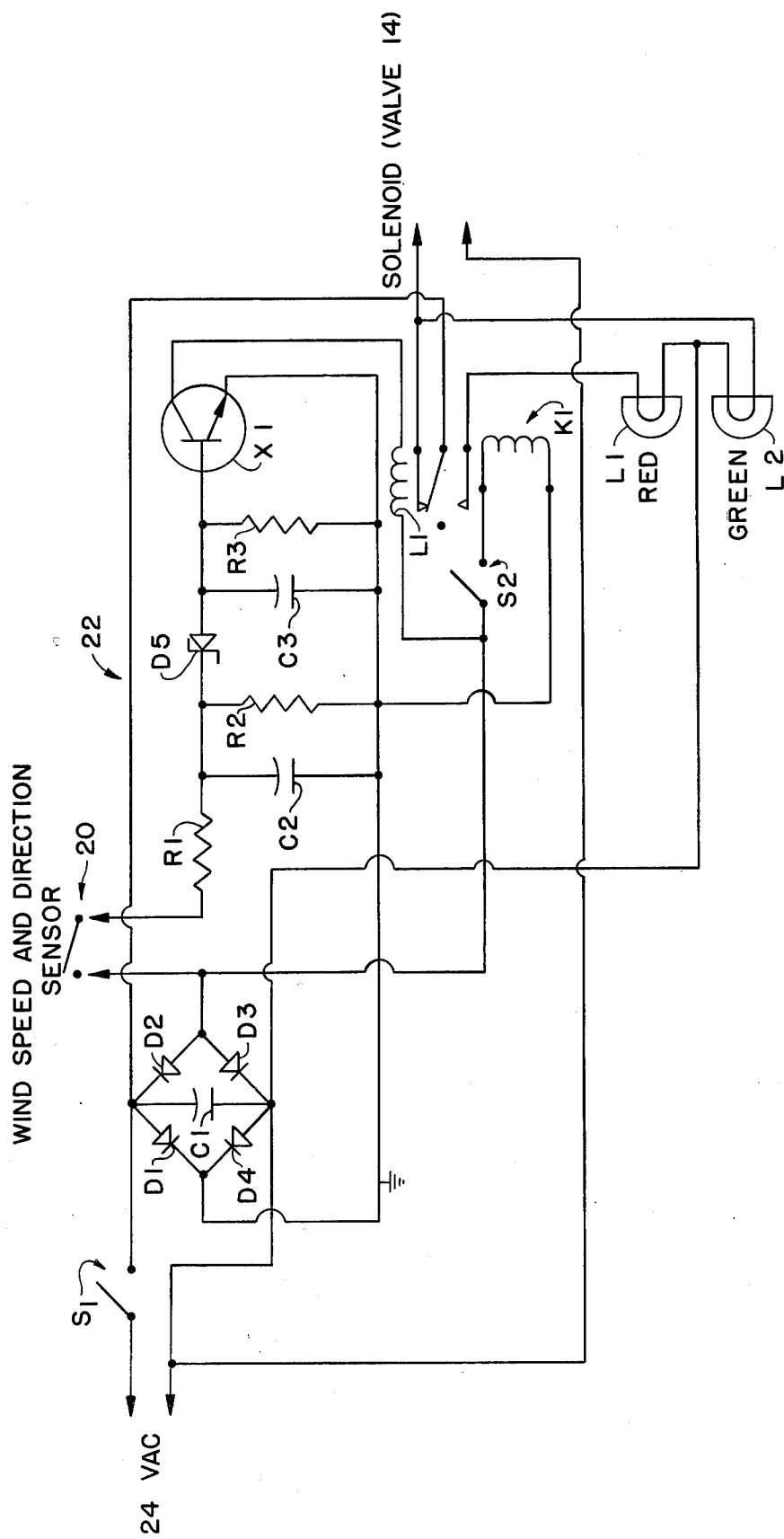
FIG._5.

INHIBITING SPRAY DISPERSION: METHOD AND APPARATUS

BACKGROUND OF THE INVENTION

This invention relates to a method and apparatus for controlling spray discharge in a windy environment, and particularly for inhibiting water flow under selected windy conditions to a sprinkler head or the like located near a roadway.

Automatic sprinkler systems, agricultural chemical spraying or watering systems, water fountains and like unattended spraying systems under normal calm and relatively windless conditions project water sprays or jets into the air such that the sprayed material falls within an intended restricted area. However, under windy conditions, the sprayed materials may be blown onto protected areas or scattered from intended areas. For example, where a sprinkler is placed along a public roadway, winds may cause water to fall on the road surface, making it slippery and dangerous to motor traffic. Similarily, chemical sprays may be carried a distance from the intended area, and could cause undesirable damage if the dispersed spray is excessive. Moreover, fountain spray under windy conditions may be blown from its intended path causing loss of water due to excessive evaporation or spillage as well as inconvenience to passers-by. There is thus a general need to limit undesired spray dispersion.

The valves in such automatic watering systems are also subject to breakdowns and failure due to dirt or rocks accumulating in the mechanism causing it to seize. It is often difficult to promptly identify the malfunction of the automatically controlled valves at the watering site. There is therefore a need to provide some indication of valve condition and operability at the watering site.

DESCRIPTION OF THE PRIOR ART

Known prior art discloses wind controlled sprinkler systems. U.S. Pat. No. 3,667,673 to Knudsen discloses a sprinkler system with a servo control mechanism wherein the discharge nozzle is redirected in response to wind direction and velocity, such that the tilt angle of a rotary spray nozzle is constantly and automatically adjusted in response to varying wind conditions.

U.S. Pat. No. 3,926,369 to Pierce discloses an insecticide spraying method and apparatus in which a change of wind direction is utilized to control discharge of a spray nozzle. The disclosure describes an apparatus which activiates a spray discharge for a selected period of time under pre-determined wind conditions.

A problem arises under gusty condition, i.e. where the wind rapidly varies between extreme levels. Wind-sensitive spraying systems may responsively oscillate as the wind rises and falls. This may cause premature failure of system components due to the stresses to which the components are subjected. In a two-state (e.g., on-/off) control system for example, a windspeed sensor set with a selected windspeed threshold hysterisis characteristic is generally ineffective to preclude premature failure. Under gusty conditions, the windspeed excursions can easily and quickly exceed the excursion limits of any practical hysterisis characteristic. As a result, a two-state system, even with a windspeed threshold-type hysterisis characteristic, may oscillate on and off frequently, thereby contributing to frequent breakdown. Thus it appears that two-state systems may have been overlooked or even rejected as a means to control spraying under windy conditions. Moreover, the known prior art systems only offer relatively complex solutions for redirecting water spray in response to wind conditions under differing wind speeds and directions.

What is therefore needed is a simple, inexpensive, yet reliable system for regulating flow and thereby dispersion of spray, especially where such complex servo control mechanisms are inadequate or otherwise ineffective due to severe or oscillatory wind conditions.

SUMMARY OF THE INVENTION

The present invention is embodied in a method and two-state control system specifically adjusted for inhibiting spray discharge of an automatic sprinkler and like unattended spraying systems under adverse wind conditions. The control system includes a wind detector having a wind sensitive member adapted to operate a switch for actuating in a conventional automatic watering system a solenoid relay valve or like regulator. The control system of the invention includes time delay means for effecting a first time delay before activating the regulator from a first state to a second state, and time delay means for preventing undesired rapid reversion to the first state, should wind conditions change during an interim period.

A particular embodiment of the wind detector includes a rotatably mounted arm with an attached blade or vane which is responsive to relatively light wind pressure displacing the arm and activating a sensitive switch regulating a solenoid or the like. The vane is typically mounted to present a face in the direction of the undesired wind source, the face being shaped to be most responsive in a selected direction. The arm and the vane attached thereto are typically hung in a vertical plane from a housing placed in proximity to the controlled area. The housing may also contain electrical timing and control mechanisms, although such related mechanisms may be remotely located.

In addition, signal lights may be provided in the control mechanism for indicating the state of the solenoid switch. The signal lights assist in identifying faulty mechanisms in the automatic watering systems such as the valves, thereby reducing the possibility of excessive water loss or creation of hazards caused by water accumulation.

The invention most generally comprises a method for automatically controlling unattended spray dispersion under windy, gusty conditions based on the principle of two-state delayed actuation. The method comprises sensing a wind condition exceeding a pre-selected speed and upon indication of the wind condition exceeding that speed for a first time period, inhibiting the discharge of spray for at least a second time period. In particular embodiments, the direction of the wind is also sensed so that the spray inhibiting mode of the control system is only operative in response to wind from an undersired direction.

It is thus an object of the present invention to provide for the interruption of spraying under selected wind conditions, particularly under gusty wind conditions. To this end, wind speed is sensed above a selected threshold and actuation is effected to interrupt spray discharge after the wind speed has been maintained for a first time period or time delay, and thereafter, should wind speed drop below the selected threshold, reinstitution of the spray discharge is delayed for at least a second period of time delay. This method has the advantages of providing a hysterisis characteristic related to the rate of change in wind speed about a threshold level rather than the mere change in wind speed.

A further object of the invention is to provide means for sensing wind speed from a selected direction for effecting interruption of a wind-sensitive operation. To this end, a sensor is provided which includes a rotatably mounted vertically oriented arm responsive to wind pressure only in a selected direction or in a narrow range of directions.

BRIEF DESCRIPTION OF THE DRAWINGS

The invention may be best understood by reference to the following detailed description in conjunction with the accompanying drawings, in which:

FIG. 1 is a perspective view of a system operative according to the invention for watering vegetation along the roadway;

FIG. 2 is a partial schematic block diagram representation of a sensor and regulator according to the invention;

FIG. 2A is useful for illustrating a direction sensitive wind detector;

FIG. 2B illustrates an anemometer useful in the invention;

FIG. 3 shows waveform diagrams useful for understanding the operation of one embodiment of the invention;

FIG. 4 is a perspective view in partial cutaway of one embodiment of a direction sensitive wind sensor; and FIG. 5 is a schematic diagram of a circuit operative according to the present invention.

DETAILED DESCRIPTION OF PREFERRED EMBODIMENTS

FIG. 1 depicts a typical application of the invention, namely an automatic roadside watering system, for purposes of illustrating the invention's operation. Specifically, the watering system comprises at least one sprinkler head 12, a remotely operable valve 14, water carrying conduit coupling the head 12 and the valve 14 providing water from a source (not shown) and a valve controller 18.

The valve controller 18 comprises a wind detector 20 and timing and switching elements referred to generally as a regulator 22. Power for operating the valve 14 and the controller 18 may be provided from a conventional power source 24, such as a 24 volt a.c. power means, as is typically used in remotely operable automatic roadside watering systems. The regulator 22 as hereinafter explained, is operative as a switch controlling a gate operating solenoid (not shown) in the valve 14.

Roadside watering systems, as illustrated, generally have at least one sprinkler head 12 located adjacent to or within watering range of a traffic area or roadway 26. Under normal relatively calm wind conditions, the pavement remains safely dry and thus protected as roadside vegetation is watered. However, windy conditions will cause water spray from the head 12 to be dispersed unless the water supply is turned off. A strong wind 28, for example, blowing across watered vegetation 30 toward the roadway 26 tends to blow water on the pavement and into the path of on-coming vehicles 32. The results of the water spray and accumulation on roadway 26 can create a hazard of slippery conditions and restricted visibility.

Under gusty conditions, wind gusts may carry only small amounts of water onto the pavement of roadway 26. This is generally not so hazardous due to acceptable rates of evaporation preventing accumulation. The present invention provides means and discloses a method for sensing wind conditions and controlling the water regulating valve 14 minimizing the hazards created by dispersed spray. For example, in FIG. 1, wind 30 blowing across the vegetation 30 toward the roadway 26 is sensed at wind detector 20, which conveys a signal to regulator 22 indicating wind speed exceeding a pre-selected level. In response to the wind speed signal regulator 22 is activated to time the duration of the detector 20 signal. At the end of the first minimum pre-determined time delay of for example a few seconds in length, regulator 22 causes valve 14 to close, thereby shutting off water flow to head 12 thus preventing further spray dispersion.

When detector 20 conveys a signal to regulator 22 indicating wind is below the selected threshold, a second pre-determined time delay is initiated. With valve 14 closed, water flow remains interrupted until the end of the second time delay, which may be several seconds. This prevents undesired oscillation between the water "on" and water "off" states should be signal of the wind detector 20 oscillates between states under gusty wind conditions.

The periods of the first and second time delay may be variable or fixed. The delays may be reset to initial conditions each time the wind oscillates through the threshold level, or the periods may be permitted to accumulate so that the state of regulator 22 is changed only after the average wind speed over a selected period exceeds the threshold level. Generally, a fixed minimum and variable maximum time delay is established before the state valve 14 may be changed.

The wind detector 20 may be responsive to wind in only a selected direction or range of directions, or it may be sensitive to wind speed from all directions. In the latter case, a standard totalizing anemometer 184 (FIG. 2B) may be used as the wind speed sensing element of the wind detector 20 of FIG. 1. For example, wind detecting rotatably mounted arms 186 may be coupled to a rotor shaft 188 of a voltage generator 190. The generator 140 may provide a voltage signal proportional to wind speed to a suitable threshold detector 192 which in turn provides appropriate control signals to regulator 22. Such a wind totalizing detector would find particular application where a protected area surrounds the spraying head 12, as for example in a circular garden, a fountain pool or along the side or the center divider of a winding roadway, or where the valve controller 18 is operative to regulate a bank of sprinkler heads or the like on the periphery of an encircling protected area.

In the application of a watering system along the border of a generally straight roadway, a directional sensor is preferred. FIG. 2 depicts a valve controller 18 with a basic directionally sensitive wind detector 20 and regulator 22. The wind detector 20 includes a moveable blade or vane 34 mechanically coupled to a two-position switch 36 through a linkage 38. Switch 36 is moveable between a first "high" position indicating high directional wind conditions and a second "off" position, to which switch 36 is normally biased under low or opposing wind conditions. A spring 40 provides bias to switch 36 the vane 34 which may be a flat plate vertically disposed and moveable in a generally vertical plane along the direction of the desired maximum wind sensitivity. To improve directional sensitivity, the vane 34 may be fabricated of a pair of flat plates 42 and 44 arranged to form a V-shape in a vertical view, as illustrated in FIG. 2A. The direction of maximum wind sensitivity is direction A, along the line bisecting the angle formed by the plates 42 and 44. Wind in direction A applies maximum pressure to vane 34 tending to displace vane 34 toward the "high" switch position. Wind in direction B and C, offset from the bisecting line, also tends to displace vane 34, although higher wind pressure is required on each of the plates 42 and 44 to effect displacement. Wind in direction D applies virtually no pressure to plate 42, thus still greater pressure is required on plate 44 for vane displacement. Side winds, for example in direction E, apply pressure to the opposing sides of plates 42 and 44, thus tending to cancel forces which would displace vane 34 toward the switch "high" position. Backwinds, on the other hand, from direction F bias vane 34 toward the "off" switch position.

The regulator portion 22 of controller 18 in FIG. 2 comprises a first timer 46, a second timer 48, a trigger 50 and a relay 52. The "high" terminal of switch 36 is connected to the input of timer 46 for coupling a positive voltage reference to the timer 46 upon closing of the "high" side switch 36 contact. The "off" terminal of switch 36 is connected to the input of timer 48 coupling a ground voltage reference to the timer 48 upon the the closing of the "off" switch 36 contacts.

Outputs of timers 46 and 48 are coupled to the input of trigger 50. Trigger 50 output drives the magnetic coil of relay 52 to activate and deactivate a solenoid (not shown) operating valve 14 (FIG. 1.)

Specifically, timers 46 and 50 may be R-C timing circuits each having pre-selected charge characteristics which determine the selected delay periods. The timers 46 and 48 may be either separate units or elements of a unified network wherein single circuit elements serve multiple functions. The trigger 50 may for example be a voltage level sensitive transistor switch with a preselected input hysteresis. One well-known switch circuit is the Schmidt trigger circuit, which may be coupled to a current switch in the conventional manner for driving the coil of relay 52.

The hysteresis characteristic of trigger 50 coupled to R-C type timers 46 and 48 determines minimum time delays between state changes of relay 52. The desire to function may be achieved in other embodiments, however. For example, timers 46 and 48 may be digital timers and trigger 50 may be a bistable multivibrator. Timers 46 and 48 may be operative to apply a trigger signal to trigger 50 only after fixed time delays following the change of state of switch 36. The trigger signal might thereby cause trigger 50 to activate and deactivate relay 52.

The invention may be better understood by reference to FIG. 3, which illustrates the operation of the invention employing R-C type time delays. FIG. 3 is a set of timing diagrams. FIG. 3A is a graph of wind speed; FIG. 3B indicates position of sensor switch 36 and therefore detector vane 34; FIG. 3C represents voltage at the input of trigger 50; and FIG. 3D represents the state of relay 52.

During the interval I, the wind component in the direction of interest is below threshold T (FIG. 3A), switch 36 is therefore in the "off" position (FIG. 3B), and the relay 52 is opened, permitting water flow (FIG. 3D). At the beginning of interval II, the wind speed exceeds threshold T (FIG. 3A). The vane 34 senses the wind speed, activating switch 36 to the "high" state (FIG. 3B). Timer 46 commences to operate, for example charging to a positive voltage at a pre-determined rate (FIG. 3C) until after a period $\Delta t_1$, a threshold X is attained causing trigger 50 to activate relay 52 to close (FIG. 3D), thereby cutting off water flow.

At the beginning of interval III, wind speed drops below threshold T (FIG. 3A), sensor switch 36 switches to "off" (FIG. 3B), and timer 48 commences to operate, i.e., charging toward a ground or relatively negative voltage level threshold Y (FIG. 3C). Attaining threshold Y causes trigger 50 to operate relay 52 thereby permitting resumption of water flow (FIG. 3D).

During interval IV with water flow as during interval I, wind speed is shown to oscillate across threshold T (FIG. 3A) causing switch 36 to oscillate (FIG. 3B), and timers 46 and 48 to alternately commence timing cycle each time switch 36 changes state (FIG. 3C). In this embodiment, the timers 46 and 48 have a memory or accumulation feature. The sum of time periods of one state is subtracted from the sum of time periods of the opposite state such that if the ratio of "on" time to "off" time of switch 36 exceeds a certain value (determined by the ratio of time delays) the trigger 50 responds, causing relay 52 to change state. Thus, even though the time between the last switch state change and the relay state change is less than a minimum time delay $\Delta t_1$ or $\Delta t_2$ (as shown at interval V, FIGS. 3B, 3C, and 3D), the minimum time delay between relay state changes can never be less than the minimum tine delay. For example the events illustrated in interval IV and the beginning of interval V can never take place in a time period less than $\Delta t_1$.

This combined memory feature of timer 46 and 48, renders the regulator 22 responsive to the degree of wind gustiness, that is, the frequency of wind oscillation is taken into account in determining how quickly the valve 14 is shut off following a last previous state change of switch 36.

Alternatively, timers 46 and 48 may be reset to initial conditions each time switch 36 changes state. Thus, relay 52 would be precluded from changing state until a fixed minimum time after switch 36 changes state.

Intervals VI, VII, and VIII illustrate the conditions where the minimum time between sensor switching and relay activation ($\Delta t_2$) is unaffected by the ratio of "on" time to "off" time. During interval VI, FIG. 3C shows the initiation of the delay period of timer 48. During interval VII, the delay period of timer 46 is activated, eventually cancelling the accumulated time of timer 48. During interval VIII, the period of timer 48 runs full course, activating relay 52 (FIG. 3D) at the end of the delay period.

FIG. 4 illustrates one embodiment of a suitable directional wind sensor 20, according to the present invention. The sensor 20 comprises a housing 54, a moveable wind blade or vane 134 and a magnetic reed switch 136. The vane 134 comprises a pair of blades 142 and 144 attached at roughly right angles along a generally vertically disposed shaft 102. The shaft 102 is part of a linkage 138 which translates movement of the vane 134 to effect switch actuation.

The linkage 138 comprises the shaft 102, a generally horizontally disposed arm 104, a horizontally disposed pivot axis 106 mounted to the housing 100, and an elbow 108 linking shaft 102 and arm 104 and rotatably coupling to the shaft 102 and arm 104 at a generally orthogonal angle. A magnet 110 is mounted at the end of arm 104 so as to confront the reed switch 136 causing actuation of its interval relay contacts upon movement of the vane 134.

A coil spring 112 is wrapped around pivot axis 106 and enclosed at one end to elbow 108. The opposite spring end is connected to a strap 114 wrapped around a rotatable pivot shaft 116.

The magnet 110 is moveable between a first position adjacent reed switch 136 and a second position spaced from the reed switch 136 in response to pivotal movement of the arm 104 about axis 106. In operation, wind pressure on the faces of plates 142 and 144 causes translation of vane 134 between the first position and the second position, causing the magnet 110 to move to the reed switch 136. The reed switch 136 closes in response to the magnetic forces for signaling a suitable sensor. Spring 112 normally biases the vane 134 toward the direction of maximum wind sensitivity. The biasing level is set by tightening or loosening spring 112 with strap 114 by turning the shaft 116. The vane 134 can be very light and carefully balanced on pivot axis 136 such that even light winds can effect a response.

FIG. 5 illustrates a suitable circuit of regulator 22 which could operate with the sensor 20 of FIG. 4. The following parts and values have been found to work adequately:

| Part Designation | Part Designation or Value |
|---|---|
| D1-D4 | power supply diode bridge |
| C1 | filter capacity |
| C2 | 1000 MFD 15 V capacitor |
| C3 | 2000 MFD 3 volt capacitor |
| D5 | zener diode V |
| R1 | resistor 4.3KOhm |
| R2 | resistor 5.1KOhm |
| R3 | resistor 150KOhm |
| X1 | transistor 2N222A |
| S1 | switch SPST |
| S2 | reed switch |
| L1 | magnetic coil proximate to S2 1200 OHM |
| K1 | relay DPDT |
| S3 | reed switch (wind sensor) |

Voltage powering the circuit of FIG. 5 is 24 volts a.c. The output of the circuit is in the form of valve solenoid-operative switching through relay K1.

The minimum time delays of the two-state circuit may range from a few seconds to as much as about 60 seconds. The minimum time delay before the water is switched off is typically on the order of one half of the minimum time delay before water is allowed to switch back on. For example the first time delay may be 10-12 seconds and the second time delay may be 20-30 seconds.

As an added feature of the circuit of FIG. 5, signal lights are provided to indicate the state of relay K1. A red light indicates that valve 14 should be closed and a green light indicates that valve 14 should be opened. This provides simple means for monitoring proper function of the solenoid-controlled valve. The solenoid-controlled valve can thereby be monitored by observing the signal lights at the control station together with the system in operation. For example the absence of water flow when the green light is illuminated indicates a possible malfunction of valve 14.

Various embodiments of this invention have been suggested and will be obvious in light of the present specification. It is therefore not intended that the invention be limited except as indicated in the appended claims.

What is claimed is:

1. A method of regulating the state of wind sensitive means and especially under gusty wind conditions, said means having a first operating state and a second operating state, said method comprising the steps of:
    continuously sensing wind speed at a preselected location relative to a preselected wind speed threshold level;
    during said first operating state, switching the state of said wind sensitive means only after at least a first minimum period during which wind speed continuously exceeds said threshold level and further inhibiting such state switching for a further variable length period proportional to the percentage of time during which wind speed does not exceed said threshold level; and
    during said second operating state, switching the state of said wind sensitive means only after at least a second minimum period during which wind speed continuously falls short of said threshold level, and further inhibiting such state switching for a further variable length period proportional to the percentage of time during which wind speed exceeds said threshold level,
    for maximizing the duration of operation in each of said operating states in proportion to variation in wind conditions relative to said wind speed threshold level.

2. The method of claim 1 wherein said wind speed sensing steps include sensing only a selected directional wind velocity component.

3. The method of claim 2 wherein said first minimum time period is less than said second minimum time period.

4. A method of regulating the state of wind sensitive means having first and second operating states comprising the steps of:
    establishing a wind speed threshold;
    establishing a first excursion limit and a second different excursion limit for a control means, said first and second excusion limits corresponding to said second and first operating states, respectively;
    establishing a first time constant defining a first time period for inhibiting transition from said first operating state to said second operating state at said first excursion limit;
    establishing a second time constant defining a second minimum time delay for transition from said second operating state to said first operating state at said second excursion limit;
    continuously sensing wind speed relative to said preselected wind speed threshold, and, during periods when wind speed exceeds said preselected wind speed threshold, advancing said control means at a rate according to said first time constant from said second excursion limit to said first excusion limit, and, during periods when wind speed is less than said preselected wind speed threshold, advancing said control means at a rate according to said second time constant from said first excursion limit to said second excursion limit without reference to operating state; and
    causing a change of operating state only upon said control means attaining an excursion limit different from the corresponding operating state, such that duration of operation in each of said operating states is at least said corresponding minimum time period and is maximized in inverse proportion to the time percentage of wind speed excursion across said preselected wind speed level relative to the current operating state.

5. The method of claim 4 wherein said control means timing is according to exponential functions defined by said time constants.

6. The method of claim 5 wherein said first time constant is less than said second time constant.

7. The method of claim 4 wherein said wind speed sensing steps include sensing only a selected directional wind velocity component.

8. The method of claim 4 wherein said wind speed threshold and said time constants are established independently of one another.

9. A system for regulating the state of wind sensitive means under gusty wind conditions, said means having a first operating state and a second operating state, comprising:
   means for continuously sensing wind speed at a preselected location relative to a preselected wind speed threshold level;
   first means for switching the state of said wind sensitive means during said first operating state only after at least a first minimum period during which wind speed continuously exceeds said threshold level and for further inhibiting such state switching for a further variable length period proportional to the percentage of time during which wind speed does not exceed said threshold level, and
   second means for switching the state of said wind sensitive means only after at least a second minimum period during which wind speed continuously falls short of said threshold level and for further inhibiting such state switching for a further variable length period proportional to the percentage of time during which wind speed exceeds said threshold level,
   such that the duration of operation in each of said operating states is maximized in inverse proportion to the time percentage of wind speed excursion across said preselected wind speed level relative to the current operating state.

10. The system according to claim 9 wherein said first and second switching means include respective first and second means for establishing a time constant defining said minimum time period and for regulating said variable length period.

11. The system of claim 10, and wherein said first time constant is shorter than said second time constant.

12. The system according to claim 11 wherein said wind speed sensing means is directionally sensitive.

* * * * *